UNITED STATES PATENT OFFICE.

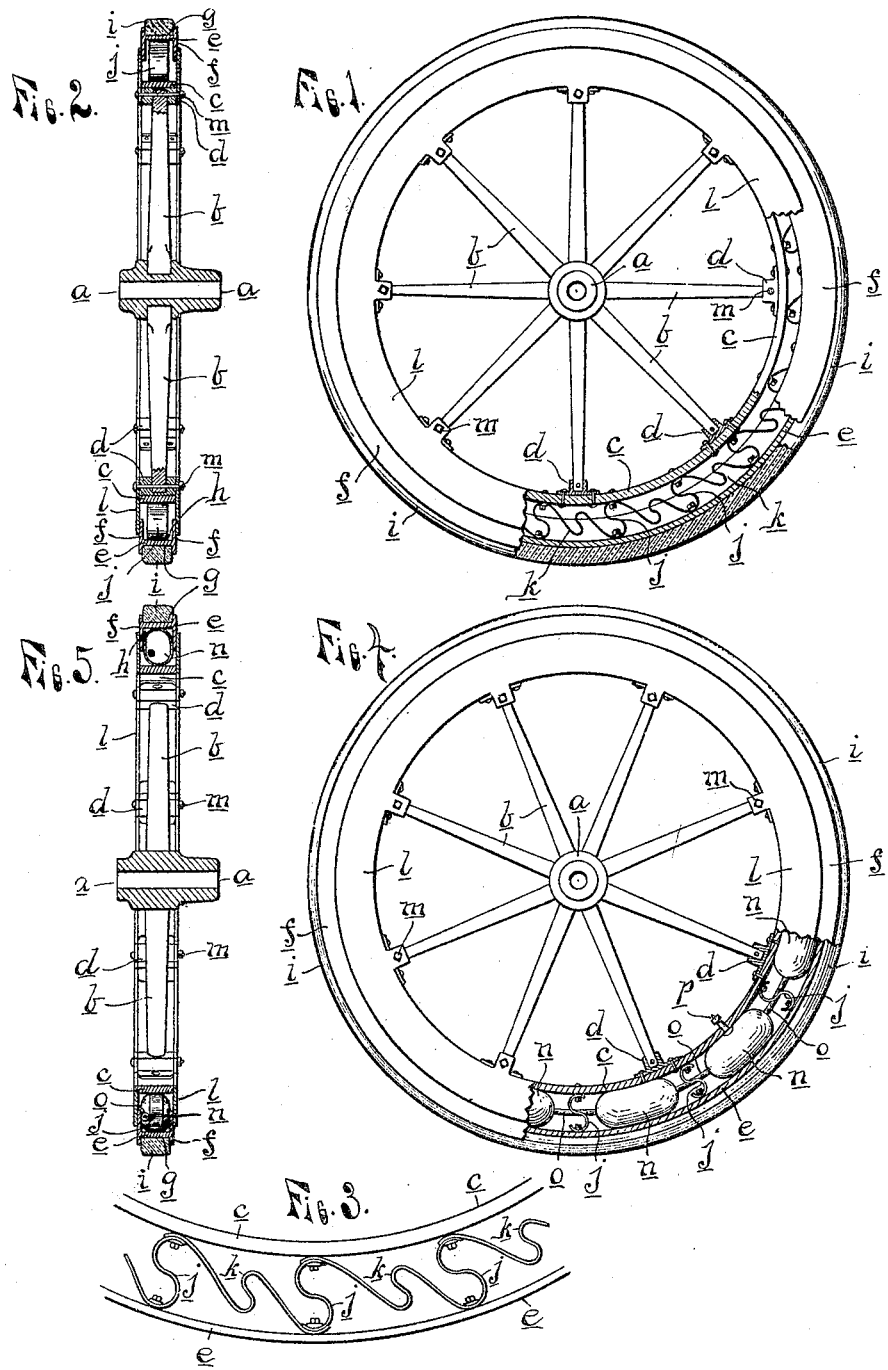

ALFRED COUSEN, OF DETROIT, MICHIGAN.

VEHICLE-WHEEL.

No. 801,852.        Specification of Letters Patent.        Patented Oct. 17, 1905.

Application filed April 4, 1904. Serial No. 201,608.

*To all whom it may concern:*

Be it known that I, ALFRED COUSEN, a citizen of the United States of America, residing at Detroit, in the county of Wayne and State of Michigan, have invented certain new and useful Improvements in Vehicle-Wheels, of which the following is a specification, reference being had therein to the accompanying drawings.

This invention relates to improvements in vehicle-wheels; and its object is to provide a wheel which combines all of the advantages attained by the use of a pneumatic tire without its objectionable features and which also has great resiliency and strength without being cumbersome and expensive to manufacture.

It is also an object of the invention to so shape and arrange the spring members that they form the sole connection between the inner and outer wheel-rims, thus allowing the inner rim to move freely in any direction against the action of said springs and to provide means whereby the spring members are supported against lateral strain and at the same time protected against injury and from becoming clogged by the accumulation of mud, &c.

A further object is to provide a wheel having the advantages of the particular construction, arrangement, and combination of parts, all as hereinafter more fully described, reference being had to the accompanying drawings, in which—

Figure 1 is a side elevation of a wheel embodying the invention, with parts broken away to show the construction; Fig. 2, an axial vertical section of the same. Fig. 3 is an enlarged detail of the spring members in side elevation. Fig. 4 is a side elevation of a wheel embodying a modified construction, with parts broken away to show the construction; and Fig. 5, an axial vertical section of the same.

As shown in the drawings, *a* is the hub, and *b* the spokes, constructed and arranged in any well-known manner, to the outer ends of which spokes an ordinary flat metal rim *c* is secured by securing sockets *d* to the rim to receive the ends of the spokes.

*e* is an outer metal rim of greater diameter than the inner rim *c* and provided with inwardly and outwardly extending flanges *f* at its edges, forming between them the groove *g* at the outer side of the rim and the groove *h* at the inner side thereof. A solid rubber band *i* is secured in the groove *g* to form the tread of the wheel, and S-shaped springs *j* are secured at one end to the rim *e* within the inner groove *h* by bolts and at their opposite ends are bolted to the rim *c*, thus connecting the rims. These springs *j* may be supplemented and strengthened by spring members *k*, secured at one end to the inner rim by the same bolts which secure the S-springs thereto and at their opposite ends to the outer rim by the bolts which hold the next adjacent springs, and they therefore serve as braces connecting the inner end of one S-spring with the outer end of the next. Intermediate the ends of each spring member *k* a double or S bend is formed to make the same flexible endwise as well as sidewise, and ring-plates *l*, secured by bolts *m* to the edges of the inner rim *c*, overlap the inwardly-extending flanges *f*, and thus the outer rim is guided by said plates and the lateral strain taken from the springs, said plates and flanges also forming the sides of a housing for the springs to prevent them becoming clogged with mud, &c., and to protect the same from being broken.

As shown in Fig. 3, the spring members *j* and *k* may be made of separate pieces and overlapped at their ends, or they may be formed in one piece; but the preferable way is to make the spring connection of sections, each section consisting of one member *j* and one member *k*, formed in one piece.

In Figs. 4 and 5 a modified construction is shown, in which the spring members K are omitted and inflated rubber sections *n* substituted therefor between the springs *j* and connected by tubes *o*, passing at one side of the springs. One of these pneumatic sections is provided with an ordinary screw-nipple *p*, through which the sections may be inflated, and fewer springs *j* are used, as these sections support the weight, the plates *l*, and flanges *f*, forming the outer casing for said sections. By this construction a very neat and sightly wheel is secured, as the springs are all hidden from view, and the plates give the wheel the appearance of having a solid rim provided with a solid rubber tire. The band *i* and outwardly-extending flanges may be omitted, if desired, and the outer face of the rim *e* will then form the tread. The peculiar form of the springs make them flexible in all directions except laterally of the wheel, and therefore the wheel will have a much greater resiliency than it otherwise would, as when the springs at the bottom of the wheel are being compressed the springs $j$ at each side will yield laterally and the springs $k$ longitudinally, and as the rims are connected by the springs only they move relatively to each other very readily.

Having thus fully described my invention, what I claim is—

1. In a wheel, the combination with an inner and an outer rim, of springs forming the sole connection between said rims and consisting of a flat strip of spring metal bent to form S-shaped portions to resist the radial movement of one rim toward the other and intermediate portions each composed of a flat strip of spring metal having double bends intermediate its ends and connecting the inner end of one S-shaped portion with the outer end of the next S-shaped portion, and means for securing the springs to the inner and outer rims at the inner and outer ends of the S-shaped portions.

2. In a wheel, the combination with an inner and an outer rim, of springs forming the sole connection between said rims and consisting of a continuous strip of spring-steel bent to form S-shaped portions to resist the radial movement of one rim toward the other and intermediate portions each having double bends intermediate its ends and connecting the inner end of one S-shaped portion with the outer end of the next S-shaped portion, and means for securing the springs to the inner and outer rims at the inner and outer end respectively, of the S-shaped portions thereof.

In testimony whereof I affix my signature in presence of two witnesses.

ALFRED COUSEN.

Witnesses:
CHARLES N. DANIELS,
LUTHER J. PARR.